April 16, 1940.  H. G. HUNTER  2,197,725

APPARATUS FOR TREATING SEWAGE AND THE LIKE

Original Filed April 13, 1936

INVENTOR
H. G. HUNTER
BY J. D. O'Connell
ATTORNEY

Patented Apr. 16, 1940

2,197,725

UNITED STATES PATENT OFFICE 2,197,725

APPARATUS FOR TREATING SEWAGE AND THE LIKE

Henry G. Hunter, Ste. Anne de Bellevue, Quebec, Canada, assignor of one-half to The Dorr Company, Inc., New York, N. Y., a corporation of Delaware Application April 13, 1936, Serial No. 74,030
Renewed December 29, 1938

10 Claims. (Cl. 210—3)

This invention relates to apparatus for treating sewage and the like to separate the liquid and solid components by sedimentation.

More particularly, the present invention relates to apparatus of the continuous flow type in which sewage or the like enters a clarifier tank through a central inlet and flows toward the periphery of the tank where an effluent weir is provided over which the clarified effluent flows into a channel or launder. As now designed clarifiers of this type are provided with a bottom wall sloping downwardly from the base of the peripheral wall to a sludge sump adjacent the central inlet. The sludge accumulating on the bottom wall is raked or scraped toward the center of the tank so as to be deposited in the sludge sump from which it is removed through the usual sludge discharge pipe.

According to the present invention, a more efficient clarifier is achieved by sloping the bottom wall of the tank downwardly from the center toward the peripheral wall and by providing for the removal of the sludge from the peripheral portion of the tank. This sloping of the bottom wall provides a tank of gradually increasing depth and sectional area toward the peripheral wall with the result that a greater settlement of light solids takes place at the periphery or deepest part of the tank where the velocity of flow is at a minimum. The removal of the sludge from the periphery of the tank eliminates the inefficient prior practice of scraping the light solids toward a central sludge sump against the radial flow of the material entering the tank through the central inlet.

Another feature of the invention consists in providing a sludge conveyor arranged to travel around the bottom wall of the tank and to scrape and convey the sludge thereon toward the periphery of the tank.

A further feature of the invention consists in removing the sludge from the periphery of the tank by means of a syphon or pump whose intake end travels around the bottom of the tank adjacent the base of the peripheral wall and whose discharge end is disposed within a sludge sump surrounding the central inlet through which the material to be clarified is introduced into the tank.

A further feature consists in providing the sludge syphon with an adjustable discharge leg and a water seal whereby the discharge of the syphon may be easily regulated to suit different operating conditions.

A further feature resides in the provision of a scum skimmer and a scum syphon pipe mounted to travel around the tank at the surface of the sewage contained therein.

A further feature consists in the provision of means whereby the material entering the tank through the central inlet is given a centrifugal motion and flows toward the periphery of the tank in a substantially curved flow path.

A further feature resides in the provision of a power driven carriage which supports and carries the sludge and scum removing apparatus and the carriage driving mechanism, said carriage being arranged to travel in a circular path on inner and outer tracks mounted on the tank.

The foregoing and other features of this invention will be more readily understood from the following description taken in connection with the accompanying drawing, in which—

Figure 1:
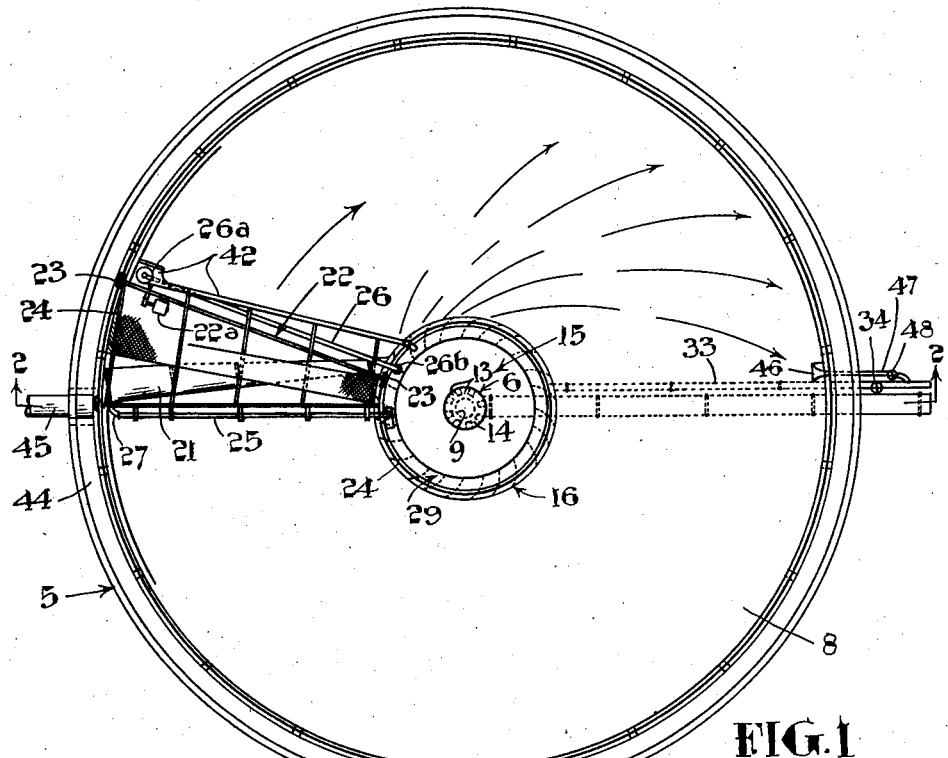
Fig. 1 is a plan view of a clarifier tank constructed in accordance with my invention.

Referring more particularly to the drawing, 5 designates a clarifier tank provided with a central vertical inlet 6, a circular peripheral wall 7, and a sloping bottom wall 8. The inlet 6 is here shown as a hollow pier or column rising from the central portion of the bottom wall 8 and provided with a vertical flow passage 9 through which the influent enters the tank. The lower end of passage 9 communicates, through an elbow passage 10, with a horizontal passage 11 in which is fitted the discharge end of the influent supply pipe 12. The influent enters the hollow feed inlet 11 from pipe 12, flows upwardly through the vertical terminal portion 6 and leaves the upper end of passage 9 through lateral flow passages 13 provided in the pier or column 6 directly below a top wall 14. As it passes through the openings 13 the influent flows downwardly in the space 15 between the upper portion of the inlet 6 and a surrounding baffle 16. From the space 15 the influent flows into the tank proper through suitable flow openings 17 provided between the supporting columns 18 of the baffle.

Figures 3, 4, 5:
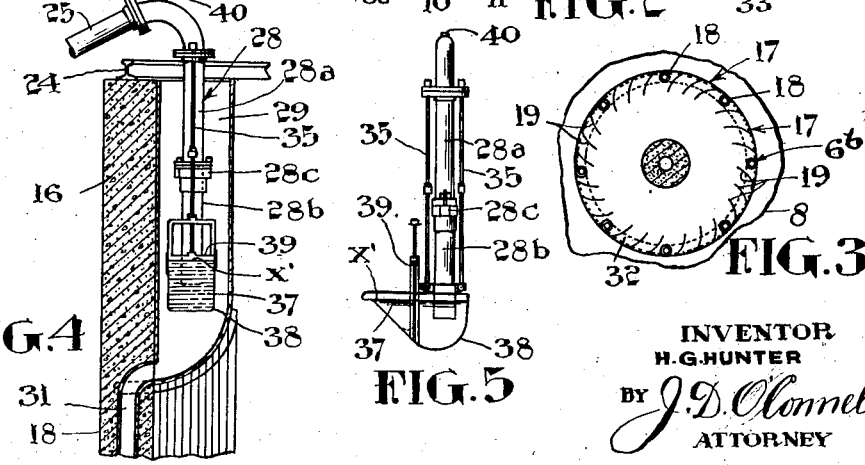
Fig. 3 is a sectional view taken along the line 3—3 of Fig. 2.
Figs. 4 and 5 are enlarged detail views of the discharge end of a sludge syphon pipe forming part of the invention.

As shown to advantage in Fig. 3, curved deflectors 19 are preferably arranged in the flow openings 17 to impart a centrifugal movement to the influent as it passes through these openings into the sedimentation portion of the tank.

From an inspection of Fig. 3 of the drawing, it will be apparent that the deflectors 19 comprise vertically arranged vanes spaced from and surrounding the vertical terminal portion 6. The liquid thus flows between the vanes 19 in a substantially horizontal manner into the tank, a curved or centrifugal path being imparted to the flow of liquid as it passes the deflector vanes. The centrifugal or substantially curved flow thus imparted to the water as it passes through the openings 17 toward the peripheral wall of the tank is of advantage in that it tends to concentrate deposits of lighter solids at the periphery of the tank which is the point at which the solids are removed by the sludge syphon hereinafter referred to.

The inlet pier 6 is preferably shaped to present a cylindrical concave deflecting surface 6a for changing the vertical downward flow in the upper portion of the space 15 to a horizontal outward flow at the openings 17. Said surface 6a is curved downwardly and outwardly from the top of the pier in such manner as to provide a step 6b at the juncture of the base of the pier with the surrounding portion of the bottom wall 8.

An important feature of the present invention consists in forming the bottom wall 8 so that it presents a smooth floor surface sloping downwardly from the bottom of the step 6b to the base of the peripheral wall 7. One advantage of this construction is that the solids settling on the bottom tend to gravitate toward the periphery of the tank from whence the solids are removed. Another advantage is that the resulting gradual deepening of the tank reduces the velocity of flow to a minimum at the periphery and causes the greater settlement of the light solids to take place at this point which, as previously stated, is the point from which the solids are removed.

The gravitational movement of the solids along the bottom wall 8 toward the periphery of the tank is assisted by the provision of a suitable scraper or sludge conveyor 21 which is carried around the tank by a travelling carriage 22. The sludge conveyor 21 is made of sheet metal and is attached to the carriage 22 so that the bottom edge just clears the sloping bottom wall 8. The top edge is level. The end of the conveyor 21 at the periphery of the tank (in section) is a quarter circle and tapers to the inner end at the baffle supporting column 18. The concaved surface of conveyor 21 is toward the direction of the travel of the carriage 22. The bottom edge of the conveyor 21 is set at any desirable angle to the radial line of the tank for the purpose of inducing the collected sludge to move to the periphery of the tank, and the sludge syphon pipe intake. The level top edge of conveyor 21 and the curved or concaved surface is so arranged for the purpose of engaging the "sludge mat" so called, and directing the sludge to the bottom and along the conveyor to the sludge intake. The carriage 22 is equipped with wheels 23 running on inner and outer circular tracks 24, the inner track 24 being mounted on the baffle wall 16 and the outer track being mounted on the upper edge of the peripheral wall 7. The carriage 22 is driven by electric motor 22a or other power. It carries the sludge syphon pipe 25 and the scum syphon pipe 26. The pipe 25 is inclined so that its lower end or intake 27 travels around the bottom wall 8 at the base of the peripheral wall 7. At the end remote from the intake 27 the pipe 25 terminates in a depending leg 28 disposed within a sludge sump 29 formed of sheet metal supported by the inner surface of baffle wall 16. The sludge delivered through pipe 25 to the sump 29 passes through pipes 31 to the sludge collecting ring 32 from whence it is withdrawn through a sludge discharge pipe 33 equipped with a valve 34. The pipes 31, which lead from the sump 29 to the sludge ring 32, are preferably located within the supporting columns 18 of the baffle 16. As shown more particularly in Fig. 4, the discharge leg 28 of the sludge syphon pipe 25 comprises two telescoping sections designated 28a and 28b. The section 28a is fitted to slide in the section 28b and works through a stuffing box 28c. The section 28b is suspended from the section 28a by adjusting screws 35 so that, by proper manipulation of these screws, the lower end of section 28b may be raised or lowered to different levels. The lower end of section 28b extends downwardly below the level of a body of water 37 contained in the water seal casing 38 supported by said section. With this construction the head of water required to make the sludge syphon operate is the difference in level between the water level in the tank and the level X' of the water in the water seal 38. It will thus be seen that the discharge through the sludge syphon may be regulated by adjusting the screws 35 to vary the water level X'. The discharge through the sludge syphon may also be regulated by raising or lowering the regulating gate 39 operating in the water seal casing 38.

The operation of the sludge syphon 25 may be initiated by closing valve 34 of the sludge discharge pipe and opening a valve (not shown) to admit water into sump 29 from the surrounding portion of the tank until the water in the sump and the water in the tank come to approximately the same level. A small hand operated vacuum pump (not shown) is then attached to the vacuum pump connection 40 (see Figs. 4 and 5) and operated to remove air from the highest point of the syphon pipe with the result that the pipe is filled with water. The valve previously opened to admit water to the sump 29 is then closed and the valve 34 opened so that the water in sump 29 discharges through the pipes 31 to sludge collecting ring 32. The syphon pipe 25 then becomes operative due to the difference in head of water in the tank and the water seal 38.

Figure 2:
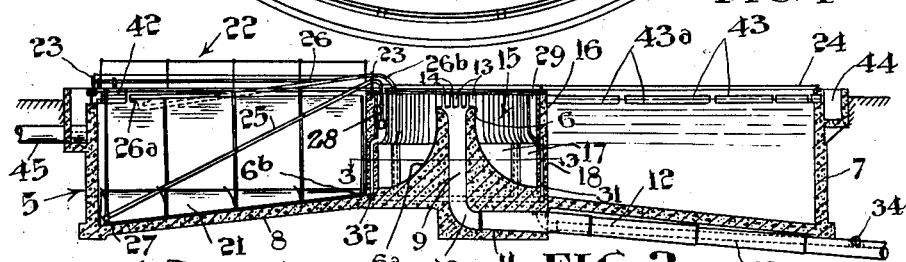
Fig. 2 is a transverse sectional view taken substantially along the line 2—2 of Fig. 1.

A surface scum skimmer 42 is supported by the carriage 22 and extends from the peripheral wall of the tank to the baffle wall 16. This skimmer is set at a suitable angle to direct surface scum into intake end 26a of the scum syphon pipe 26. This pipe delivers to the sludge sump 29, into which the discharge end of the pipe extends as indicated at 26b in Figs. 1 and 2. The clarified liquid flows out of the tank over effluent weirs 43a set in openings 43 in the peripheral wall 7 and enters a channel or launder 44 from which it is withdrawn through the effluent discharge pipe 45. The tank 5 is also provided with a drain outlet 46 connected by drain pipe 47 to the sludge discharge pipe 33. Pipe 47 is provided with control valve 48.

In the present instance I have shown a tank in which the component parts, including inlet 6, peripheral wall 7, bottom wall 8, baffle 16 and launder 44 are made of concrete but it will be apparent that these parts may be made of metal or any other desired material. It will also be apparent that various other changes and modifications in the construction and arrangement of parts is contemplated within the scope and spirit of the appended claims.

Having thus described my invention what I claim is:

1. A clarifier comprising a tank presenting bottom and peripheral walls, said bottom wall sloping downwardly toward the peripheral wall and an effluent weir carrier by the upper portion of the peripheral wall, a hollow feed pier rising from the central portion of the bottom wall, a baffle surrounding the upper portion of the pier and supported by spaced columns rising from the said bottom wall, a sludge sump carried by said baffle, outer and inner tracks carried, respectively, by said peripheral wall and said baffle, a carriage arranged to travel on said tracks, a sludge conveyor supported from said carriage and arranged to move sludge accumulating on the bottom wall toward the periphery of said wall and a sludge syphon also supported by said carriage, the intake end of said syphon being arranged to travel around the bottom wall close to the base of the peripheral wall and the discharge end being disposed within said sump.

2. A clarifier as set forth in claim 1 including a sludge collecting pipe carried by the bottom wall of the tank and sludge pipes leading to said sludge collecting pipe from the bottom of the sludge sump, said pipes being contained within the baffle supporting columns.

3. A clarifier as set forth in claim 1 including a scum skimmer supported from said carriage and a scum removing pipe having its intake end positioned close to the outer end of said skimmer and its discharge end extending into the sludge sump, said scum skimmer being mounted to travel with said carriage and to skim the surface of the liquid in the tank.

4. A clarifier as set forth in claim 1 including deflectors arranged between the baffle supporting columns to impart centrifugal flow to the liquid as it passes between the columns on its way from the feed pier to the periphery of the tank.

5. A clarifier comprising a tank provided with bottom and peripheral walls, the bottom wall sloping downwardly toward the peripheral wall, a hollow feed pier rising from the central portion of the bottom wall, an effluent weir carried by the upper portion of the peripheral wall, a sludge sump surrounding the upper portion of the feed pier, means for moving sludge accumulating on the bottom wall toward the periphery of said wall and means for removing sludge from the peripheral portion of the bottom wall comprising a sludge syphon having its intake end positioned close to the bottom wall at the base of the peripheral wall and its discharge end extending downwardly into the sludge sump, said syphon being movable around the tank so that the intake and discharge ends of the syphon traverse the entire circumference of the tank, the discharge end of said syphon comprising upper and lower telescopic pipe sections, the lower section being adjustable vertically on the upper section and a water seal in which the lower extremity of said lower section is submerged, said water seal being carried by said lower section.

6. A clarifier as set forth in claim 5 including a regulating gate arranged within the water seal.

7. A circular clarifier tank comprising a bottom wall including a central, hollow feed pier presenting a cylindrical concave outer surface gradually increasing in diameter from the top of the pier to an intermediate point located in a plane above the base or bottom of the pier, said curved surface serving to provide a streamline flow deflecting surface and to form a step at the base of the pier and a smooth floor surface surrounding said pier and sloping downwardly from the bottom of the step to the base of the peripheral wall of the tank, a plurality of spaced columns rising from the bottom wall of the tank and arranged in circular series around the feed pier, a circular baffle carried by the upper ends of said columns, a sludge sump carried by said baffle and a sludge pipe carried by the bottom wall of the tank, each of said columns being provided with a conduit extending therethrough from the bottom of the sump to said sludge discharge pipe.

8. A circular clarifier tank provided with a smooth floor surface sloping downwardly to the base of the peripheral wall of the tank from a relatively small central area of the bottom wall where the material to be clarified is introduced, and an elevated sludge sump supported from said central area of the bottom wall, said sump consisting of an annular casing comprising side and bottom walls, the inner side wall and the bottom wall being curved to provide a streamline deflecting surface for directing the sludge toward sludge outlets located adjacent the outer side of the sump.

9. A clarifier comprising a tank provided with a central, upwardly projecting, hollow feed pier and a smooth floor surface surrounding the base of the feed pier and sloping downwardly therefrom to the base of the peripheral wall of the tank, an elevated circular sludge sump surrounding the upper portion of the pier in spaced relation thereto, said sump comprising side and bottom walls, the inner side wall and the bottom wall being curved to provide a streamline deflecting surface for directing the sludge toward sludge outlets located adjacent the outer side of the sump, sludge removing means arranged to travel around the tank close to the base of the peripheral wall and to transfer sludge from the lower portion of the sloping floor surface to said sump, and a sludge conveyor extending tangentially across the sloping floor surface from a step formed at the base of the pier to a point close to the peripheral wall of the tank, said sludge conveyor serving to move the sludge accumulating on the sloping floor surface toward the base of said peripheral wall where the sludge is picked up by the sludge removing means.

10. A clarifier comprising a circular tank provided with a smooth floor surface sloping downwardly to the base of the peripheral wall of the tank from a relatively small central area of the bottom wall where the material to be clarified is introduced, an elevated sludge sump supported from said central area so that the bottom of the sump lies well below the liquid level of the tank while the top of the sump is disposed above said level, said sump comprising an annular casing formed by side and bottom walls, the inner side wall and the bottom wall being curved to provide a streamline deflecting surface for directing the sludge toward sludge outlets located adjacent the outer side wall of the sump, a traveling sludge removing pipe having the intake end thereof arranged to travel around the tank close to the base of the peripheral wall and an adjustable syphon leg connected to the discharge end of said pipe and disposed within the sludge sump, said sludge removing pipe serving to transfer sludge from the lower portion of the sloping floor surface to said sump.

HENRY G. HUNTER.